United States Patent [19]

Denker

[11] Patent Number: 5,055,093
[45] Date of Patent: Oct. 8, 1991

[54] ORBITAL SPROCKET DRIVE

[76] Inventor: James M. Denker, 711 First Parish Rd., Scituate, Mass. 02066

[21] Appl. No.: 470,132

[22] Filed: Jan. 25, 1990

[51] Int. Cl.$^5$ .............................................. F16H 7/06
[52] U.S. Cl. ..................................... 475/167; 475/176
[58] Field of Search ............... 475/167, 176, 210, 162, 475/170; 74/390, 63, 462; 474/164, 84; 248/603

[56] References Cited

U.S. PATENT DOCUMENTS

| | | | |
|---|---|---|---|
| 976,126 | 11/1910 | Gerb | 248/603 X |
| 1,786,203 | 12/1930 | Gilbert | 248/603 X |
| 2,934,297 | 4/1960 | Mitzl | 248/603 |
| 2,953,930 | 9/1960 | Meyer | 474/164 X |
| 3,190,149 | 6/1965 | Gorfin | 475/167 |
| 3,710,635 | 1/1973 | Whitehorn | 475/167 |
| 3,783,712 | 1/1974 | Colinet | 74/805 |
| 4,183,267 | 1/1980 | Jackson | 475/162 X |
| 4,321,842 | 3/1982 | Stromotich | 74/762 |
| 4,407,170 | 10/1983 | Fukui | 475/162 X |
| 4,640,154 | 2/1987 | Osborn | 475/167 X |

FOREIGN PATENT DOCUMENTS 0923508 4/1963 United Kingdom .................. 475/170

OTHER PUBLICATIONS

American Cycloidal Gear Speed Reducer Brochure, May 29, 1984, 2 pages.
Orbidrive Speed Reducer Brochure, 1 page.
SM-Cyclo 3000 Series Speed Reducer, *Machine Design*, Nov. 9, 1989, p. 66.
Trogotec, Inc. Planetary Speed Reducer, *Machine Design*, Nov. 9, 1989, p. 67.
Andantex-Acbar Orbital Reducer for Robots Brochure, 1 page.

*Primary Examiner*—Leslie A. Braun
*Assistant Examiner*—Matthew Stavish
*Attorney, Agent, or Firm*—Hale and Dorr

[57] ABSTRACT

The invention is a drive for transducing rotation of a motor shaft having a multiple eccentric journal having a hollow sized to fit over the motor shaft and at least one pair of journals, each member of a pair being concentric with an axis parallel to the axis of the hollow and spaced apart from its mate an equal distance on opposite sides of and coplanar with a hollow axis. The eccentric journal is secured to the motor shaft and a rotational bearing is attached to each journal. Associated with each bearing is a transmission wheel having means for mounting the wheel to the bearing eccentrically with respect to the transmission wheel an equal radial amount from the axis of rotational symmetry of each transmission wheel as compared to the other transmission wheel. The invention provides a high ratio, single stage transmission with few moving parts, and without complicated case, lubrication or torque arms.

14 Claims, 12 Drawing Sheets

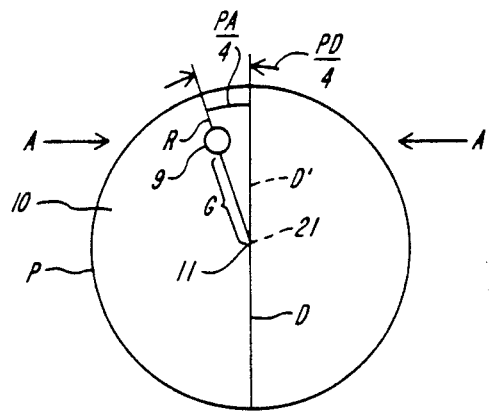
FIG. 8A
FIG. 8A'
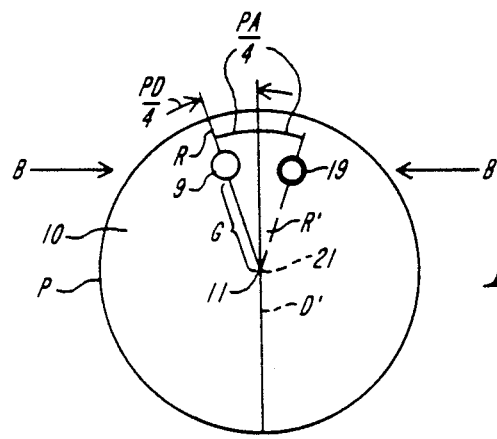
FIG. 8B
FIG. 8B'

ORBITAL SPROCKET DRIVE

This invention relates generally to the field of power trains and relates specifically to an orbital sprocket chain drive that can be used as the principal part of a speed reducer.

BACKGROUND OF THE INVENTION

A large number of light duty production machines, including food processing, material handling, conveying, packaging machines, etc., use relatively simple and reliable AC motors having a fixed 1800 RPM, nominal, output speed. A typical, very popular motor, standardized as the National Electrical Manufacturers Association NEMA-56 frame size, is manufactured and sold by many manufacturers. Typically, the motor has a no load output of one speed only, based on the electrical cycle upon which it operates and its internal configuration. It is necessary to obtain usable output (rotational or translational), at speeds different from that of the motor, and in some cases at selectively different speeds.

It is known to provide a speed reducing gearbox which, through a series of gears interacting with the output shaft of the motor, provides a reduced speed, and in some cases selectively variable reduced speeds. A gearbox typically consists of a number of interactive gears of appropriately varying diameters and matched tooth pitch, and a housing to restrain translation of the gears while allowing them to rotate upon axles. In order to ensure smooth operation of the gears, it is necessary to lubricate them using oil or grease. It is also necessary to seal the housing so that the oil or grease lubrication does not leak out into the work environment, which may be in a food processing plant or other situation where stray lubricant would be undesirable.

Typically, it is possible to reduce the speed of rotation at each stage (i.e., across each gear pair) by no greater a degree than 1/5. Therefore, depending upon the relation between the output of the motor and the speed desired for the driven device, multiple stages might be required. For instance, the NEMA-56 referred to above operates at 1800 RPM. Typical applications require an input of no greater than 100 RPM, for instance stock feeders, conveyors, pallet wrappers, and food processing machines. Thus, a typical reduction would require two or more stages or four or more gears. Each additional stage requires accurately aligned bearings and a housing to carry the torque reaction to structure either through mounting brackets or a torque arm, depending upon whether the speed reducer is rigidly mounted (with shafts flexibly coupled) or floating on the input or output shaft (with the torque reaction passing to structure via a link pivot mounted at its ends between the structure and some point on the reducer housing offset from the shaft centerline (i.e. a torque arm)).

Standard gear reduction systems suffer from numerous additional drawbacks. The housings required to hold the gear train in place while each of the gear elements rotates at a high rate of speed are heavy, expensive and large. The housing must securely contain the necessary grease or other lubricant within it. The gear system is noisy and produces high vibrations at various frequencies. Maintenance cost and time are rather high, due to deterioration of the various rolling surfaces, degradation of the lubricant and wasted energy due to heating. Further, because the gears rotate at high rates of speed, during maintenance or other times when the housing is removed, they can present a serious hazard to workers in the vicinity.

Thus, the several objects of the invention include providing a means for reducing or enhancing the speed of a rotary shaft while: eliminating lubricants and their leaks; eliminating excess weight, such as heavy sealed casings, gears and bearing housings; eliminating mounting brackets and torque arms; eliminating shaft couplings and alignment problems; eliminating maintenance adjustments for wear; reducing the space occupied by the drive package; improving the safety conditions under which the machine can be operated; reducing the number of moving parts; reducing the number of different types of parts; minimizing risk of destruction of the drive upon overload; accomplishing all of the foregoing with a fully reversible capability; and providing for variable degrees of speed reduction. These and other objects of the invention will be evident to one of ordinary skill in the art with reference to the following description and figures of the drawing.

BRIEF DESCRIPTION OF THE INVENTION

A preferred embodiment of the invention is a drive for transducing rotation of a motor shaft, comprising a multiple eccentric journal unit having a hollow sized to fit over the motor shaft and at least one pair of journals, each member of a pair concentric with an axis parallel to the axis of the hollow and spaced apart an equal distance from its mate on opposite sides of and coplanar with the hollow axis, where the eccentric journal unit is secured to the motor shaft. Attached to each journal, is a rotational bearing, and associated with each bearing is a transmission wheel. The transmission wheels include means for mounting the wheels to the bearing eccentrically an equal radial amount as compared to the other transmission wheels.

In a preferred embodiment, the journal unit is dual eccentric and has only one pair of journals.

A belt may engage the transmission wheels. As the motor shaft rotates, the eccentric mountings cause each wheel to orbit without rotation in a circular motion about a center within its body. The wheels are approximately ½ cycle out of phase. For a portion of each cycle, each wheel contacts and pulls certain portions of the belt along in its orbit, while the other wheel contacts and pulls other portions of the belt along. As the wheels orbit, a given portion of the belt is handed back and forth from one wheel to the other. Consequently, the wheels drive the belt.

The action is analogous to the motion of a flexible ring carried around by two twiddling thumbs.

In a first preferred embodiment, the wheels are sprocket wheels and the belt is a chain. In a second preferred embodiment, the wheels are toothed timing pulleys and the belt is a toothed timing belt. In a third preferred embodiment, the wheels are toothless pulleys and the belt is a toothless belt.

FIGURES OF THE DRAWING

FIGS. 8a, 8a', 8b, and 8b', show schematically the relative location of the bearing bores in each of the two sprockets in a preferred embodiment. FIGS. 8a and b are front elevations and FIGS. 8a' and b' are cross-sectional top plan views along the lines a—a and b—b, respectively.

FIG. 8a shows a pair of identical aligned sprockets, each with a journal bore. FIG. 8b shows the sprockets of FIG. 8a, with the sprocket in the rear flipped about a diameter D'.

Figure 9:
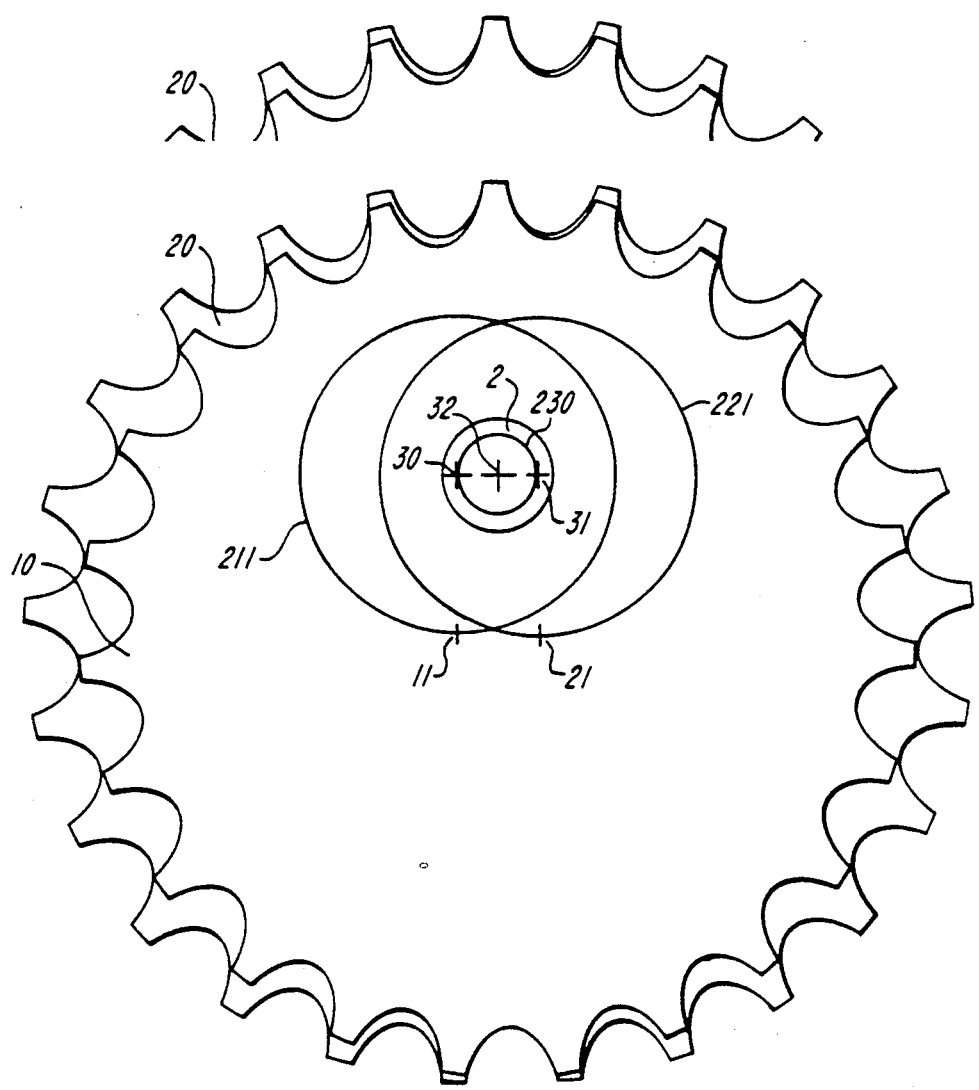

FIG. 9 shows schematically a front elevation view of a pair of sprockets, with some parts removed, to illustrate the orbital paths of the centers of rotational symmetry of the sprockets and the orbital paths of the axes of the bearings (not shown) upon which the sprockets are mounted to the motor shaft.

Figure 10A:
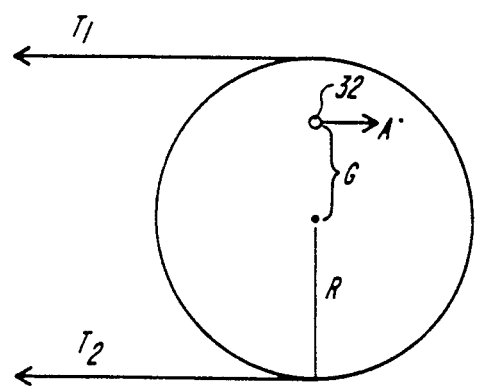

FIG. 10a is a schematic showing the tension in a chain driven by the sprocket, and the forces acting on a sprocket wheel.

Figure 10B:
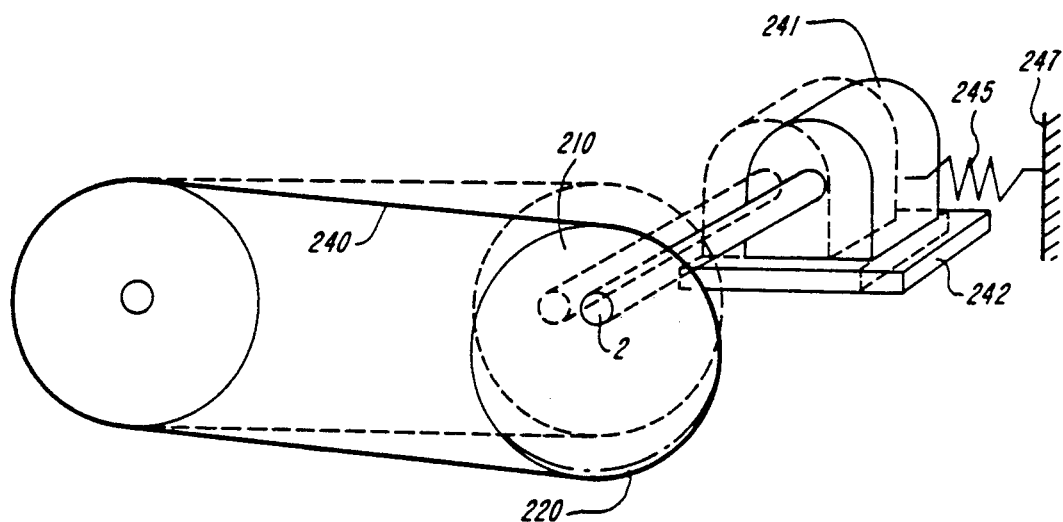

FIG. 10b is a schematic showing a strip-resistant embodiment of the invention having a spring mounted motor.

Figure 10C:
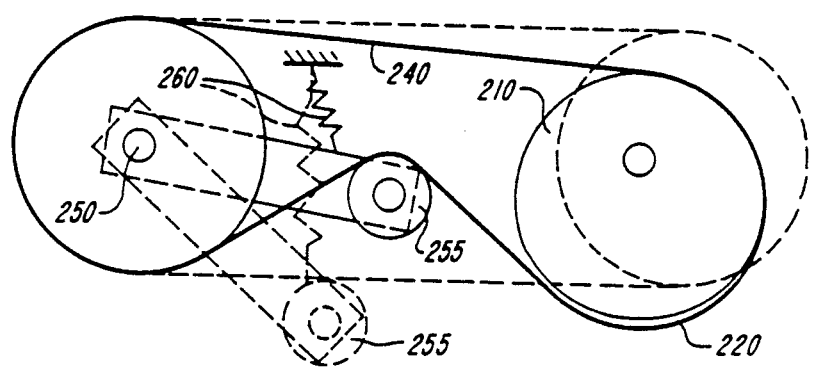

FIG. 10c is a schematic showing a strip-resistant embodiment of the invention having a spring mounted idler wheel.

Figure 11:
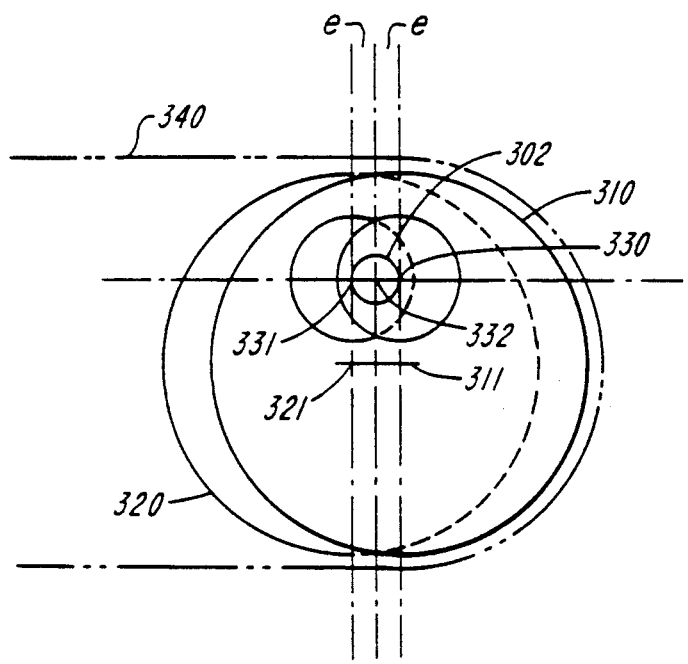

FIG. 11 shows schematically an embodiment of the invention employing a toothless pulley and a toothless belt.

FIG.. 12 shows schematically an embodiment of the invention employing more than two transmission wheels.

Figure 13:
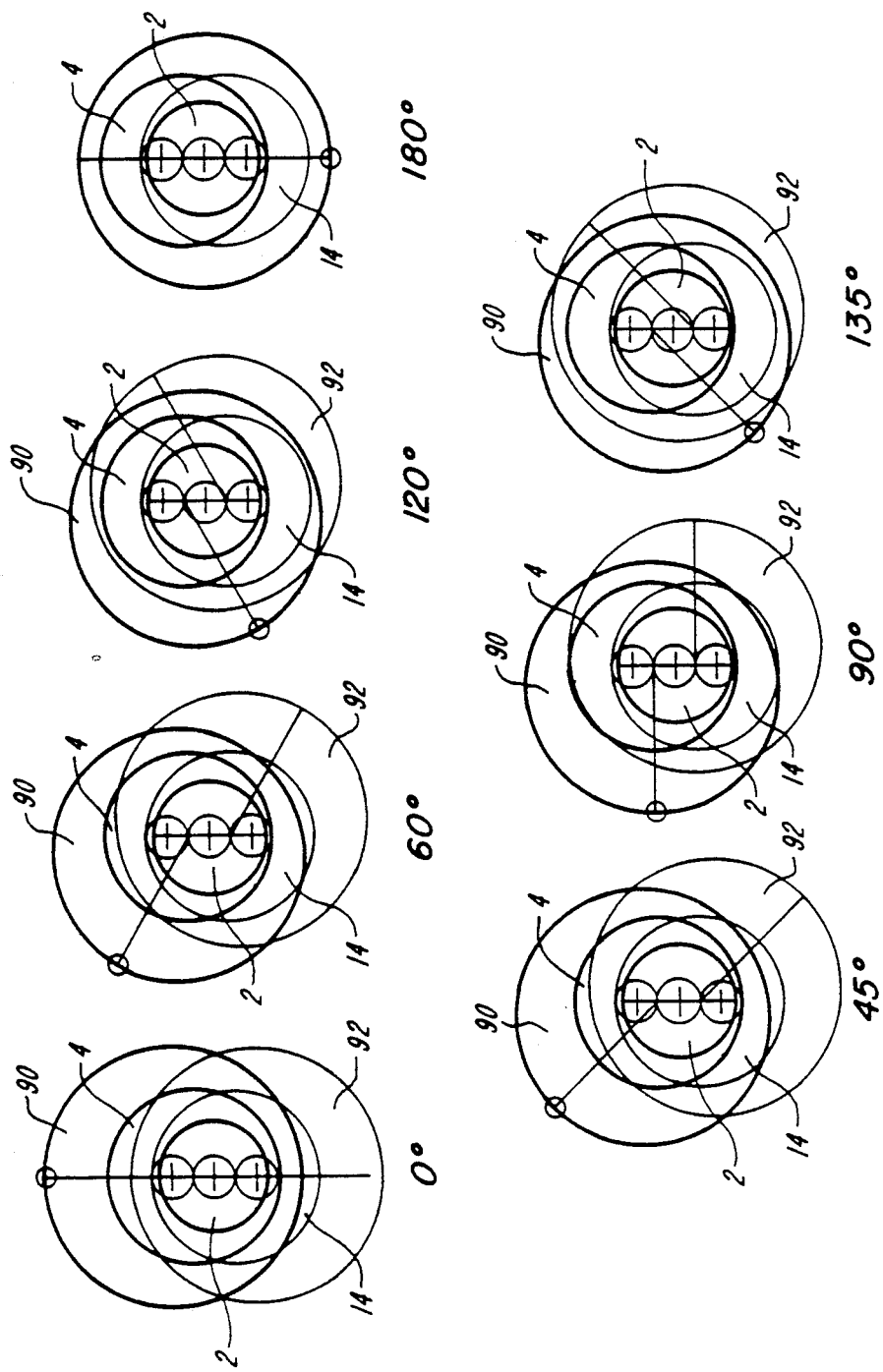

FIG. 13 shows schematically two eccentric sleeves for use with the invention, to be mounted between the dual eccentric journals and the bearings.

DETAILED DESCRIPTION OF A PREFERRED EMBODIMENT OF THE INVENTION

A preferred embodiment of the invention will be described, first with reference to FIG. 6. It is helpful to describe the several eccentricities initially. A shaft 2 provides output from a single speed motor not shown. A journal 4 is mounted eccentrically on shaft 2 and rigidly fixed by means of set screw 6. A bearing 8 is mounted concentrically on journal 4. Attached to bearing 8 is sprocket wheel 10. Sprocket wheel 10 is one-half the thickness of a standard sprocket wheel. As is evident from FIG. 6, sprocket 10 is mounted eccentrically on bearing 8 with respect to the axis of rotational symmetry of sprocket 10.

Figure 6:
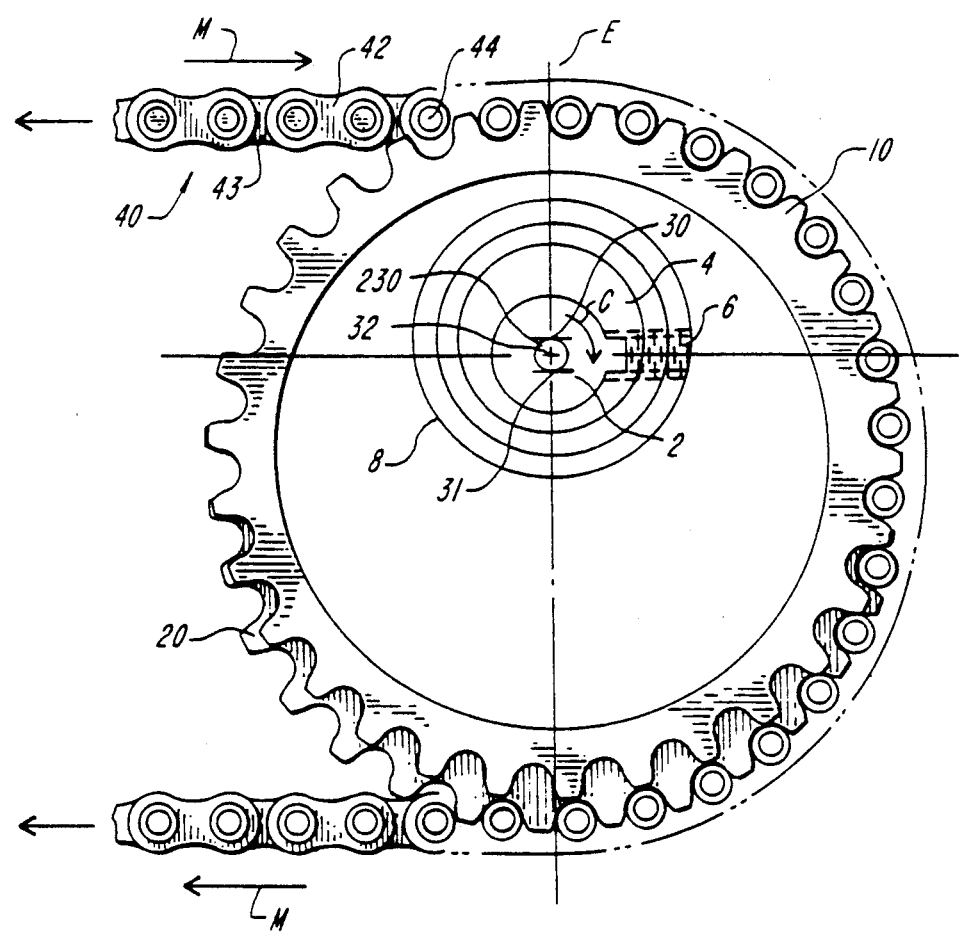
FIG. 6 is a schematic front elevation view showing an orbital sprocket drive engaging a chain, which may be arranged to transmit force to many different types of devices.

An identical sprocket wheel 20 is also mounted through a similar journal (not shown) and bearing (not shown) to axle 2, behind sprocket 10, as viewed in FIG. 6. The journal associated with sprocket wheel 20 is also eccentric with respect to axle 2, but it is eccentric in an opposite direction as compared to the eccentricity of journal 4 associated with sprocket wheel 10. Therefore, the two sprocket wheels 10 and 20 are not in register.

Figure 2:
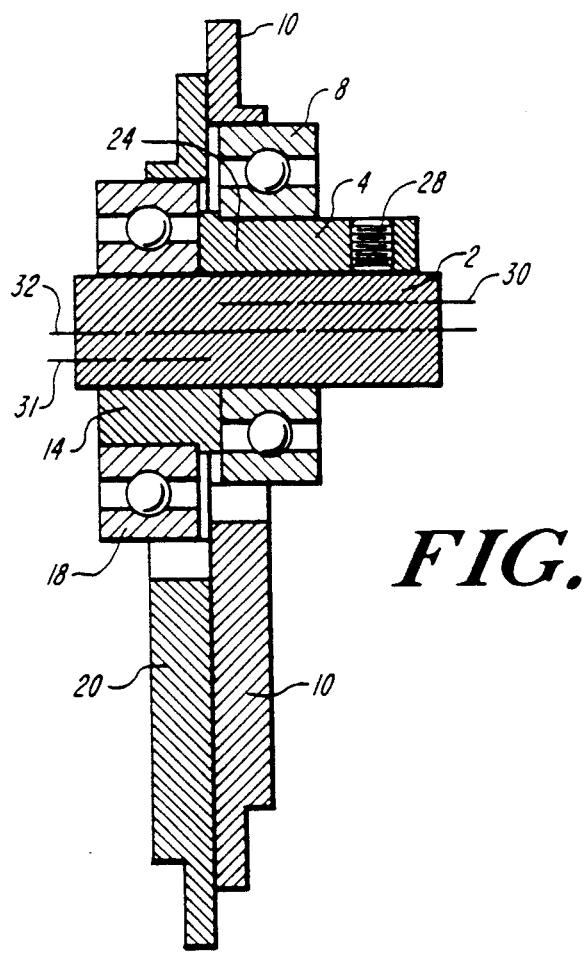
FIG. 2 is a side cross-sectional view of the invention shown in FIG. 1 along the lines A—A.
Figure 3:
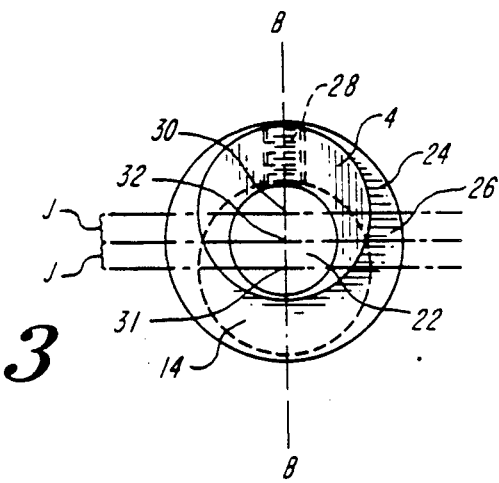
FIG. 3 is a side elevation view of a dual eccentric journal unit of the invention with some parts shown in phantom.

Journals 4 and 14 are part of journal unit 24, as shown in FIG. 3. Journal unit 24 has a hollow central bore 22, which is concentric with flange 26. Flange 26 is not essential to operation or an understanding of the invention, however, it facilitates alignment and manufacture. Hollow bore 22 is sized to slip over the output shaft (not shown) of the driving motor. Set screw 28 secures journal unit 24 to the shaft. Journals 4 and 14 are cylindrical and are aligned such that their axes of symmetry 30, 31 are spaced apart, equal distances from axis 32, along a diameter of the central bore 22. Consequently, the axes 30, 31 of bearings 8 and 18 (FIG. 2) mounted on the journals orbit around axis 32, at 180° out of phase. The outside races of bearings 8 and 18 spin around orbiting axis 30, 31 respectively.

Figure 1:
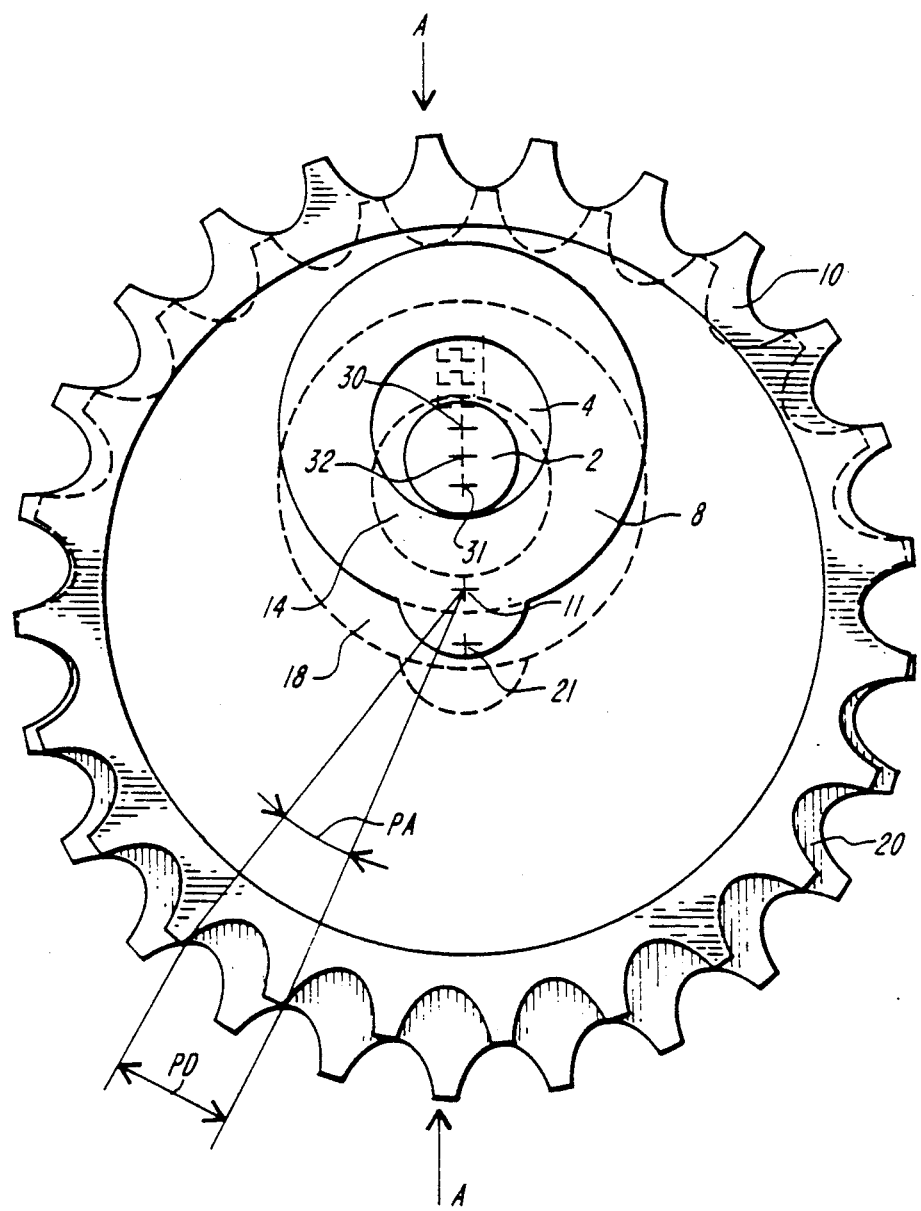
FIG. 1 is a front elevation of the orbital sprocket drive of the invention with some parts shown in phantom.

It is useful to define several terms. The "pitch distance" PD (FIG. 1) is the distance measured circumferentially, at the pitch circle of the sprocket, between corresponding locations on adjacent teeth. The "pitch angle" PA is the angle between the radii upon which lie corresponding locations on adjacent teeth. The "pitch cycle" is the pattern of tooth and trough, which repeats once for every circumferential pitch distance. It is also useful to define a line between and perpendicular to the two journal axes 30, 31 as the "journal segment," and the plane which includes both axes as the "journal plane."

Figure 4:
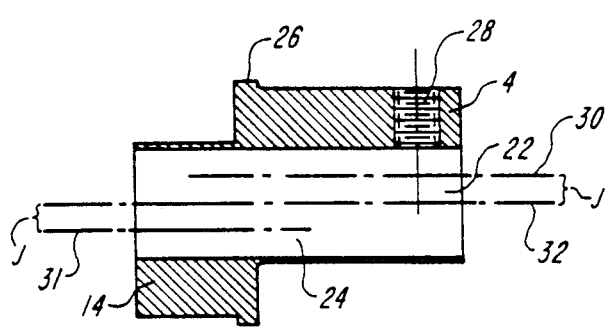
FIG. 4 is a side elevation cross-sectional view of the journal unit shown in FIG. 3, along the lines B—B.

As shown in FIGS. 3 and 4, each journal axis 30, 31 is offset from the central axis 32 of bore 22 by a distance J equal to ¼ of a pitch distance or PD/4. Thus, the axes 30, 31 of journals 4, 14 are always separated from each other by a distance, 2×J, equal to ½ a sprocket tooth pitch distance or PD/2.

The mounting of sprockets 10 and 20 upon journal unit 24 is shown with reference to FIG. 2. The construction of each of the sprocket wheels will be further understood with reference to FIGS. 1 and 2. Sprocket wheel 10 is shown in bold and sprocket wheel 20 is shown in a lighter outline, with some lines in phantom. The center of rotational symmetry of the sprocket teeth of sprocket wheel 10 is indicated at 11 and the corresponding center of sprocket wheel 20 is indicated at 21.

Journal unit 24 is mounted upon motor shaft 2 by means of set screw 28. Sprocket 10 is mounted by means of bearing 8 upon journal 4 of journal unit 24. Sprocket 10 is mounted eccentrically with respect to bearing 8. Sprocket 10, because it is mounted to bearing 8, rotates around axis 30, which axis orbits about axis 32. Sprocket 10, having an axis of rotational symmetry 11, is mounted eccentrically to bearing 8, and thus its rotation thereabout is eccentric. Thus, the rotation of sprocket 10 with respect to axis 32 is doubly eccentric: due to the eccentricity between axes 30 and 32; and due to the eccentricity between axes 11 and 30. Further, sprocket 10, even if constrained not to rotate, orbits around axis 32 (which is within the body sprocket 10) due to the rotation of shaft 2.

Similarly, sprocket 20 is mounted eccentrically through bearing 18 upon journal cylinder 14, which is exactly 180° out of phase from journal cylinder 4. [Note, as discussed below, sprocket 20 and sprocket 10 as orientated, have their respective bores 19 and 9 rotated apart from each other with respect to their respective pitch cycles. Thus, sprockets 20 and 10, as mounted, are not simply 180° out of phase. Their relative displacement is more complicated.] Outer race of bearing 18 is free to spin about axis 31 of journal cylinder 14, which axis itself also orbits about axis 32. The rotation of sprocket 20 with respect to axis 32 is the similarly doubly eccentric. Further, sprocket 20 orbits around axis 32.

Figure 5:
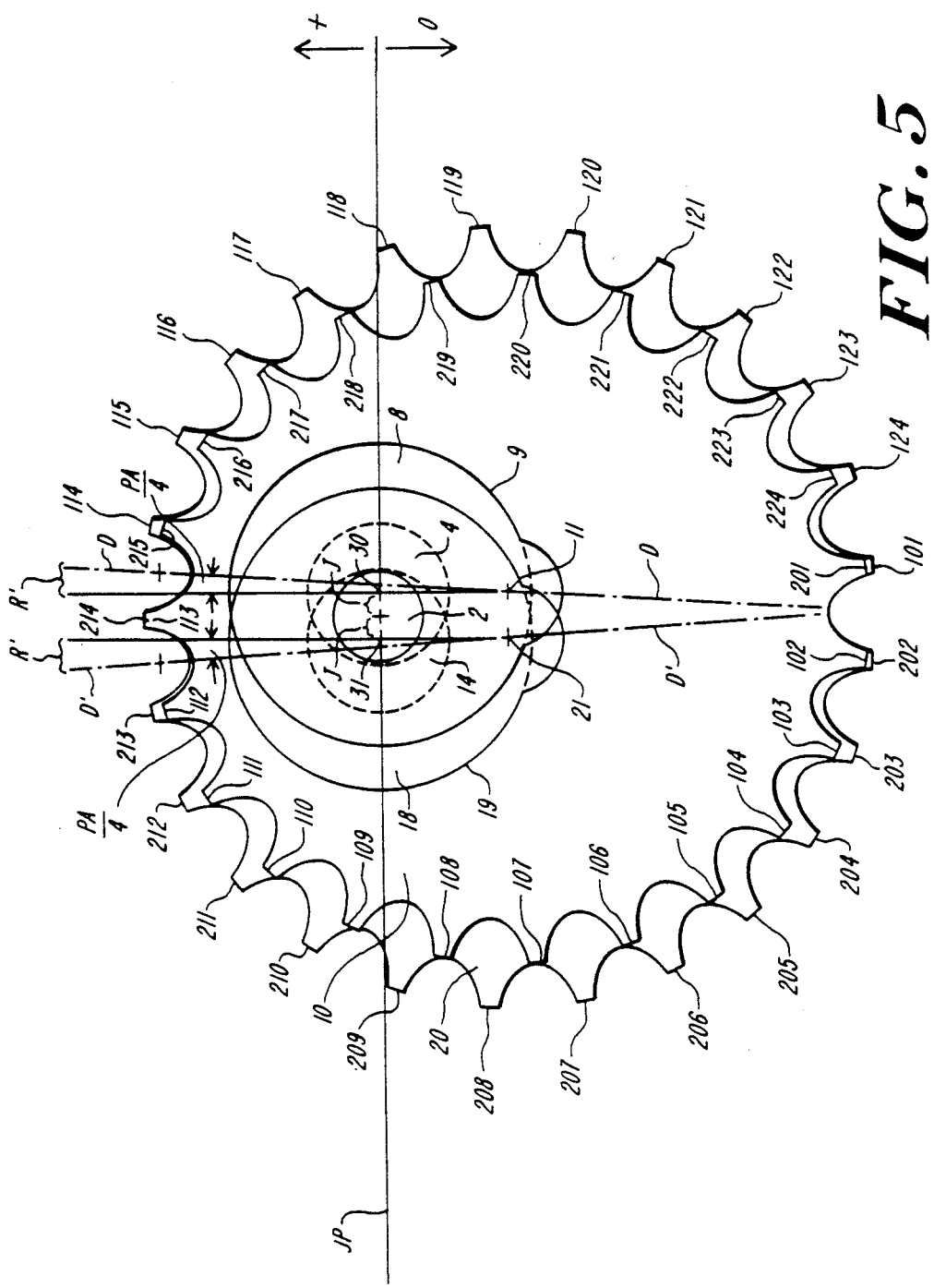
FIG. 5 is a schematic front elevation view of the sprocket set of FIG. 1, arranged to illustrate the relative eccentricities of the two sprockets as mounted on the dual eccentric journal unit of FIG. 3.
Figure 5A:
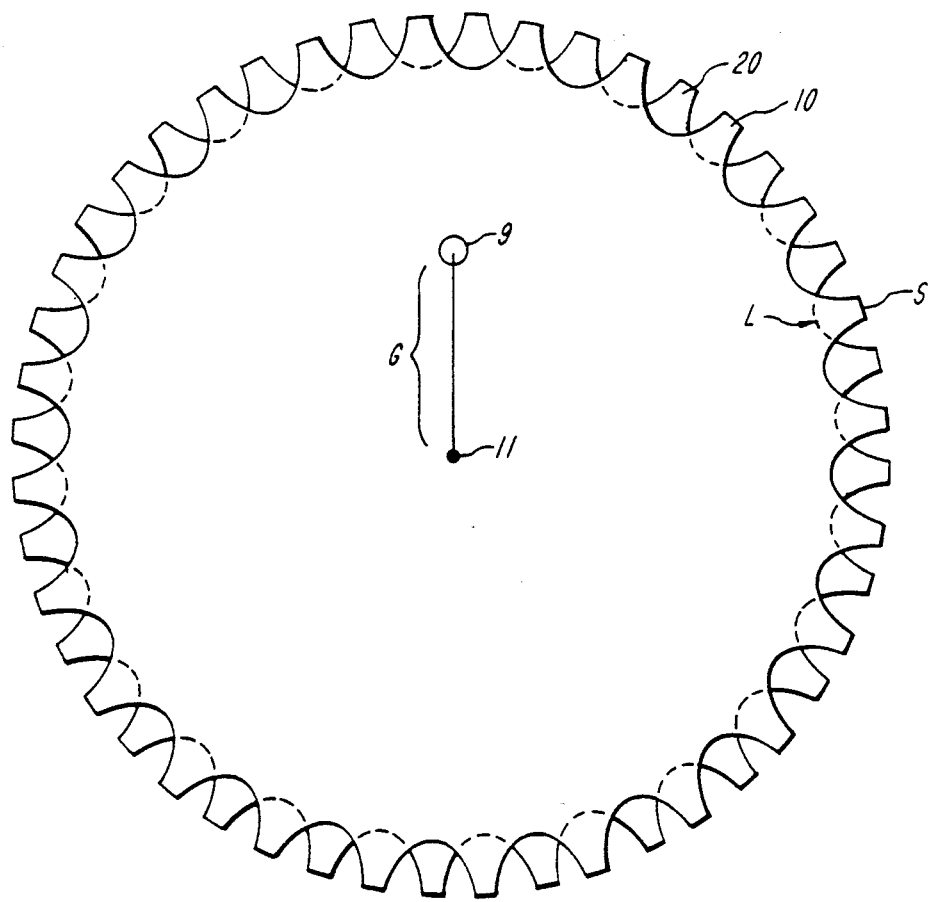
FIGS. 5a and 5b show a pair of sprockets of the invention in two different arrangements to show the relative placement of their respective, bearing bores.

Referring to FIG. 5a, the bore 9, through which bearing 8 will be mounted is offset from the axis of rotational symmetry 11 by a distance G. [The size of the bore 9 is schematically shown undersized, to facilitate explanation.] The purpose of this offset is to generate a force or torque multiplication between the loaded and unloaded segments of the driven belt, such as a chain, and will be described in more detail below.

The locations of the mountings of sprockets 10 and 20 upon their respective bearings 8 and 18 with respect to the pitch cycle enables the desired relative thumb twiddling type sprocket motion, which hands the chain from one sprocket to the other thereby driving it forward. The bearing centers are located with respect to the pitch cycle such that, if the centers of rotation 11, 21 of the sprockets 10, 20 are aligned coaxially and the centers of the bearing bores 9, 19 are also aligned, then the sprocket teeth of the sprockets will be phase shifted by an amount of ½ pitch cycle with respect to the immediately facing portion of the other sprocket.

This is shown in FIG. 5a. Neither bearing bore 19 nor center of symmetry 21 of sprocket 20 are visible. As can be seen, the points S of sprocket 10 and L of sprocket 20 are out of phase by ½ pitch cycle.

Figure 5B:
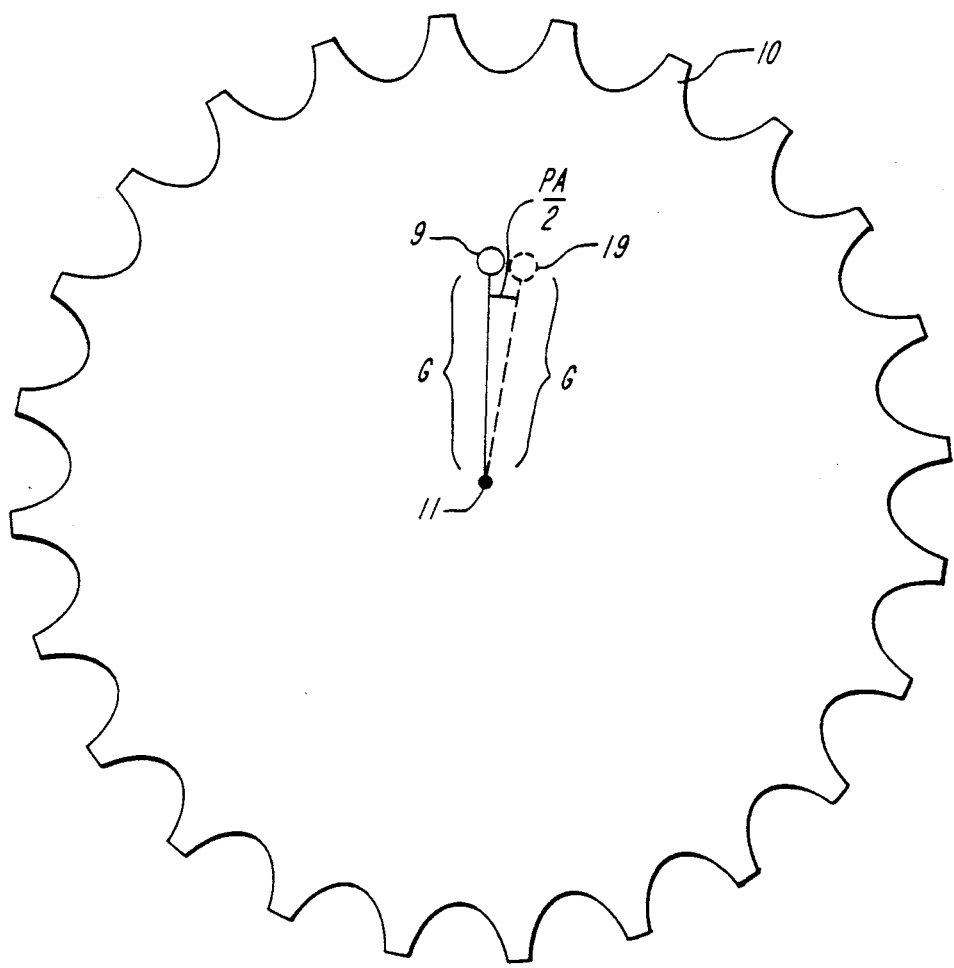

It is also the case that if the centers of rotation 11, 21 are coaxially aligned and all of the teeth are brought into register, then the smallest angular separation possible between the two bearing bores 9 and 19 is ½ a pitch angle or PA/2. This is shown in FIG. 5b, with the location of bearing bore 19 indicated in phantom. Other portions of sprocket 20 are not visible because they are exactly behind corresponding portions of sprocket 10.

FIG. 5 shows schematically the orientation of sprockets 10 and 20 once mounted upon dual eccentric journal unit 24. Journal unit 24 has journal cylinders 4 and 14, each offset 180° out of phase from each other, and axes 30, 31 spaced apart a distance of 2×J. It will be recalled that J=¼ pitch distance, or PD/4. Thus, the total separation of the axes 30, 31 is 2×PD/4=PD/2.

Sprocket 10 is mounted through bore 9 on bearing 8 which in turn is mounted upon eccentric journal cylinder 4. Sprocket 20 is mounted through bore 19 upon bearing 18 to eccentric journal cylinder 14. Constrained by the dual eccentric journal unit 24, the central axes 30, 31 of bearings 8 and 18 will always be separated by 2×J or PD/2.

To illustrate the relative placement of sprockets 10, 20, it is helpful to consider a pair of example sprockets similar to, but not identical to sprockets 10, 20. The example sprockets are identical to each other and are identical to sprockets 10, 20, except that the bearing bores of each are in the same location relative to the pitch cycle, rather than being offset by ½ pitch angle as discussed above. Thus, when their centers of rotational symmetry are aligned coaxially and the sprocket teeth are held in register, the bearing bores through both sprockets are coaxial. If the example sprockets were to be placed upon journal unit 24, by translating each parallel to the journal segment, then the sprocket teeth that were once in register would be spaced apart from their former mates, each by ½ a pitch distance or PD/2 in the direction parallel the journal segment. In this example, the sprocket analogous to sprocket 10 would have moved from the registration position to the right and that analogous to 20 would have moved to the left.

It is now helpful to consider replacing the example sprockets with the actual sprockets 10, 20, having their bearing bore locations with respect to the pitch cycle offset from each other by ½ the pitch angle or PA/2. As is shown in FIG. 5 the center 30 of bore 9 is located to the left of the diameter D. The center of the example bore analogous to bore 9 lay exactly on its analogous diameter. Thus, in placing sprocket 10, the diameter, and thus the teeth of sprocket 10 are located more to the right, i.e. further from the teeth of sprocket 20, than the ½ pitch distance that would have obtained in the case of the example. The similar (but opposite) angular offset of bore 19 compounds this gap. Consequently, the sprocket teeth are spaced apart from potential mates by one full pitch distance along a line parallel to the pitch segment.

It is possible to rotate each sprocket about the center of the respective bearing so that two pairs of teeth come into register. At one location, a pair of two teeth comes into register, and half way around the sprocket pair another pair of teeth comes into register. In this mode, the pair of sprockets create an envelope of a single, slightly oval sprocket, having a tooth count of one greater than the identical sprockets alone.

This situation is shown schematically in FIG. 5. As can be seen, sprocket 10, (in bold), has 24 teeth identified by reference numerals 101–124. Similarly, sprocket 20 (shown in lighter outline) also has 24 teeth identified by reference numerals 201–224. The combined sprocket envelope presents a slightly oval sprocket having 25 teeth: 201–214 (=13)+114–124 (=11)+101=25 (Note that tooth 113 is in register with tooth 214, and, thus was not counted separately). These 25 teeth are made up of 12 teeth from each semi-circle of sprockets 10 and 20 for a total of 24, and 1 tooth (113/214) made up of a shared tooth from both sprockets 10 and 20, for a total of 25.

It will be recalled that the distance J equals ¼ of a pitch distance, or PD/4. The axes 30 and 31 are the axes of journal cylinders 4 and 14, respectively, which are each offset a distance J from axis 32 of the main body of dual eccentric journal unit 24. When sprockets 10 and 20 are held in the orientation shown in FIG. 5, so that they present the image of the oval 25-tooth sprocket, the centers of bearings 8 and 18, located on axes 30 and 31, respectively, are located a distance of 2×J or PD/2 apart from each other.

It will also be recalled that the bores 9 and 19 which carry bearings 8 and 18 in sprockets 10 and 20, respectively, were located apart from each other with respect to the pitch cycle by an angular displacement equal to 178 the pitch angle, or PA/2, as shown in FIG. 5a and 5b.

The combined offset resulting from the dual eccentric journal unit 24 and the different eccentric mountings of the sprockets 10, 20 on their bearings 8, 18 can be visualized by considering the superposition of the two offsets: first, the translation offset caused by the eccentric journal unit 24, parallel to the journal segment, a total distance of ½ pitch distance or PD/2; second, a pair of corresponding offsets of ½ a pitch distance at the pitch circle at opposite ends of a diameter, resulting from the rotation about the centers 30, 31, to locate the bores 9, 19. The offsets are in opposite directions for an additional combined ½ of a pitch distance or PD/2, resulting in a total offset on a side of the journal plane JP designated by the arrow 0 of zero pitch distance (½ − ½) and on the other side of the journal plane JP, designated by the arrow +, of one full pitch distance (½ + ½). As shown in FIG. 5, the translation spreads the two bearing centers apart by one-half pitch, and the relative rotation is clockwise around axis 30 in the amount of PA/4 of sprocket 20 and counterclockwise around axis 31 in the amount of PA/4 of sprocket 10.

In a preferred embodiment, the two sprockets 10, 20 are manufactured identical in all respects, including the locations of the bearing bores relative to the pitch cycle. Rather than differentiating the sprockets, one is flipped after fabrication, and thus effectively acts as a sprocket having its bearing located at the desired different location with respect to the pitch cycle.

FIGS. 8a, 8a', and 8b, 8b', show schematically the location in this preferred embodiment of the bore for the bearings 8 and 18. (For clarity, the sprocket teeth are not shown.) FIGS. 8a and 8b show two alignments of sprockets 10 and 20, that illustrate the manufacture of the sprockets. They do not illustrate any configuration of the assembled apparatus. FIG. 8a is a schematic front elevation view of sprocket 10. Sprockets 10 and 20 are identical to each other, having identical pitch distances, pitch angles, pitch cycles and numbers of teeth. Sprocket 20 is placed exactly behind sprocket 10, with its teeth exactly in register with those of sprocket 10, and therefore is not visible in the front elevation view. However, FIG. 8a' shows a schematic top plan cross section along the lines a—a, showing both sprockets 10 and 20.

The axis of symmetry 11 lies on a diameter (D). Diameter D is arbitrarily located. It serves merely as a fixed reference relative to the sprocket pitch cycles, as they are in register between sprockets 10 and 20. The bore 9 is offset angularly from diameter D along a radius R. Radius R is located angularly with respect to diameter D (and thus the pitch cycles) ¼ of a pitch angle or PA/4 as measured from centers 11, 21. Thus, it intersects the pitch circle P of sprocket 10, a distance equal to ¼ of a pitch distance, or PD/4, away from the intersection of Diameter D and the pitch circle P. In other words, for a sprocket having N teeth, the angular displacement PA/f4 (in degrees) between diameter D and radius R = (360° /N) × ¼. In the case of a 24 tooth sprocket, PA/4 = 3.75°. Each radius also intersects such that there is a phase separation of ¼ pitch cycle between the pitch cycle condition of immediately facing sites of each sprocket.

As shown in FIG. 8a', sprocket 20 is identical to sprocket 10, having a bore 19 located with respect to Diameter D' the same angular separation PA/4 away.

An intermediary arrangement of sprockets 10 and 20 is also shown in FIG. 8b. This arrangement is not present in the final association of the sprocket wheels, however, it facilitates understanding of the different eccentric mountings of components in the present embodiment. As shown in FIG. 8b, sprocket 10 remains situated identically with its orientation in FIG. 8a. However, sprocket 20 has been flipped about axis D', so that bore 19 (which in FIG. 8a' is shown coaxial with bore 9 and to the left of diameter D') is no longer coaxial with bore 9 and is now to the right of diameter D'. The axes of rotational symmetry 11 and 21 (not visible) remain coaxial. The centers of bores 9 and 19 now each lie on radii R and R', respectively, each displaced from the diameter D, D': by an angle PA/4. The angle between the two radii is PA/2. Thus, the distance between the intersection of the pitch circle P and radius R and the pitch circle P and radius R' is 2 × PD/4 = PD/2, one half a pitch distance as desired. Because the bores were located identically with respect to the pitch cycle, and then flipped, the points at which radius R intersect the pitch circle P is phase separated by ½ pitch cycle from the point immediately facing it on the other sprocket. This is also true with respect to the point at which radius R' intersects the pitch circle.

The relative location of the bearing bores is exactly the same as if a first bore were made in one sprocket, and the second sprocket were rotated ½ a pitch angle about its center and then a bore were made in the second sprocket coaxial with the first. This is the general arrangement described first above with respect to FIGS. 5a, 5b. The two are functionally equivalent. The preferred embodiment just described has the obvious advantage of being much easier to manufacture. Only one special part need be machined, rather than two.

Thus, to summarize the general case of the geometric arrangement of the two sprockets 10 and 20 upon the motor shaft 2, a dual eccentric journal unit 24 is mounted upon motor shaft 2 with a pair of journals 4, 14, 180° out of phase. Each journal carries a concentric bearing 8, 18. Bearing 8 supports sprocket 10 eccentric of the center 11 of sprocket 10 by a preselected distance G. Bearing 18 supports sprocket 20 by an eccentric bore also displaced by G from the center 21 of sprocket 20. The bores through sprockets 10 and 20 are arranged so that when the centers 11 and 21 and the bores 9, 19 are colinear, the phase separation between facing teeth is ½ a pitch cycle.

In the preferred embodiment described above, the two sprockets 10, 20 are identical. Each bore is located on a radius ¼ of a pitch angle from an arbitrary diameter D about which one of the sprockets is flipped. This results in a total angular separation (with respect to the pitch cycle) between the two bores of ½ a pitch angle, and a distance separation between the radii as they intersect the pitch circles of ½ a pitch distance.

It will be evident that each sprocket 10, 20 is free to spin on its bearings about the respective central axis 30, 31 associated with its respective journal. For instance, as shown in FIGS. 2 or 5, sprocket 10 is free to rotate (eccentrically) about axis 30 and sprocket 20 is free to rotate (eccentrically) about axis 31. As will be understood, the entire sprocket 10 can rotate about axis 30. This is illustrated in FIG. 9, showing the circular path 211 along which the center 11 of sprocket 10 can orbit around axis 30. Similarly, circular path 221 is shown along which center 21 of sprocket 20 is free to orbit around axis 31.

It should be understood that, although sprockets centers 11 and 21 are free to orbit along the paths described, in actual operation of the device, discussed below, the centers do not orbit through a complete 360° cycle. Thus, the sprockets do not rotate a complete cycle. In fact, during normal load situations, rotation is confined to a very small range.

With further reference to FIG. 9, central axis 32 of motor shaft 2 is shown. Because journal unit 24 is a dual eccentric journal, each of the journal cylinders 4 and 14 having axes 30 and 31, themselves orbit around central axis 32. As shown in FIG. 9, axes 30 and 31 orbit about axis 32 along circle 230.

Thus, focusing first on sprocket 10 alone. For every rotation of motor shaft 2, axis 30 orbits once along circle 230. Sprocket 10 is free to rotate eccentrically about axis 30. Therefore, sprocket 10 is free to rotate about an axis that is itself moving in a circle. The same consideration applies to sprocket 20.

Engagement of the sprocket to a chain will be understood with reference to the following description. In a preferred embodiment of the invention, as shown in FIG. 6, sprockets 10 and 20 engage a chain 40 made up of links 42, 43 and rollers 44. Sprockets 10 and 0 are each one-half the thickness of a standard sprocket, so that a pair of sprocket teeth aligned back to back will fit between the two plates that make up the links 42 of chain 40.

A principal object of the preferred embodiment of the invention is to convert the rotary motion of motor shaft 2 into the chain motion of chain 40. This translation will be understood with reference to FIGS. 6, 7 and 9. As has been set out above with reference to FIG. 9, each of sprockets 10 and 20 are free to rotate about moving axes 30 and 31 due to bearings 8 and 18, respectively. When the pair of sprockets are spun around on bearings 8, 18 and aligned generally as shown in FIG. 5, they appear as a slightly oval-shaped sprocket having one additional tooth than either of the individual sprockets. If the free rotation of the sprockets about their bearing axes is constrained to a narrow range of motion (such as by the chain), and the motor shaft rotates, the oval-shaped envelope is maintained and rotates with the frequency of the motor shaft. The pairing of gear teeth that are in register migrates all the way around the oval, once per rotation of the motor shaft. (Note: the gear teeth do not migrate. They only orbit in a relatively small circle. It is the pairing that migrates, analogous to a moving wave.)

Referring now to FIG. 6 and FIG. 5, with sprockets 10 and 20 mated so that they form the oval envelope, and with the sprockets rotated about axis 32 so that the distance between axis 32 of the motor shaft 2 and the point E that chain 40 is first engaged by the sprocket is the shortest, the rotational motion of motor shaft 2 is translated into the linear motion of chain 40. Chain 40 is wrapped around the dual eccentric sprocket made up of sprockets 10 and 20. The chain 40 engages both of the sprockets over a portion of their circumference. The sprockets are offset such that at the top, as shown in FIG. 6, the teeth of sprocket 10 (in the foreground) are free to engage the chain and the teeth of sprocket 20 are not (because they are spaced away from the chain, inside of the pitch circle of sprocket 10). At the bottom, the opposite situation exists, and on the right-hand side, the teeth from both of the sprockets are substantially free to engage the chain.

As motor shaft 2 rotates, for instance in a clockwise direction as shown by arrow C, the axes 30, 31 of bearings 8 and 18, travel along the circle 230. The inner races of the bearings orbit about the shaft axis 32, while rotating about the respective orbiting journal axes 30, 31.

It is possible in the case of bearings 8 transmitting some frictional forces, for the outer races of the bearings, and thus for the sprockets 10 and 20, to themselves rotate about orbiting axes 30 and 31. In fact, in the absence of a chain, with the proper balance of friction and sprocket weight, the sprockets would rotate around orbiting axes 30, 31. However, the presence of chain 40 substantially prevents that rotation and synchronizes the sprockets. Instead, each of sprockets 10 and 20 orbits eccentrically about axis 32, each point on each of the sprockets following a circle of the diameter of the circle 230 shown in FIG. 9 along which axes 30, 31 travel. The diameter of that circle is one-half of a pitch distance or PD/2.

Because each of the sprockets is moving about similar paths, points which are at one moment in register, such as the teeth 113, 214 in FIG. 5, will move apart a distance of two diameters of circle 230, i.e., one full pitch distance, during each cycle of the motorshaft 2.

Figure 7:
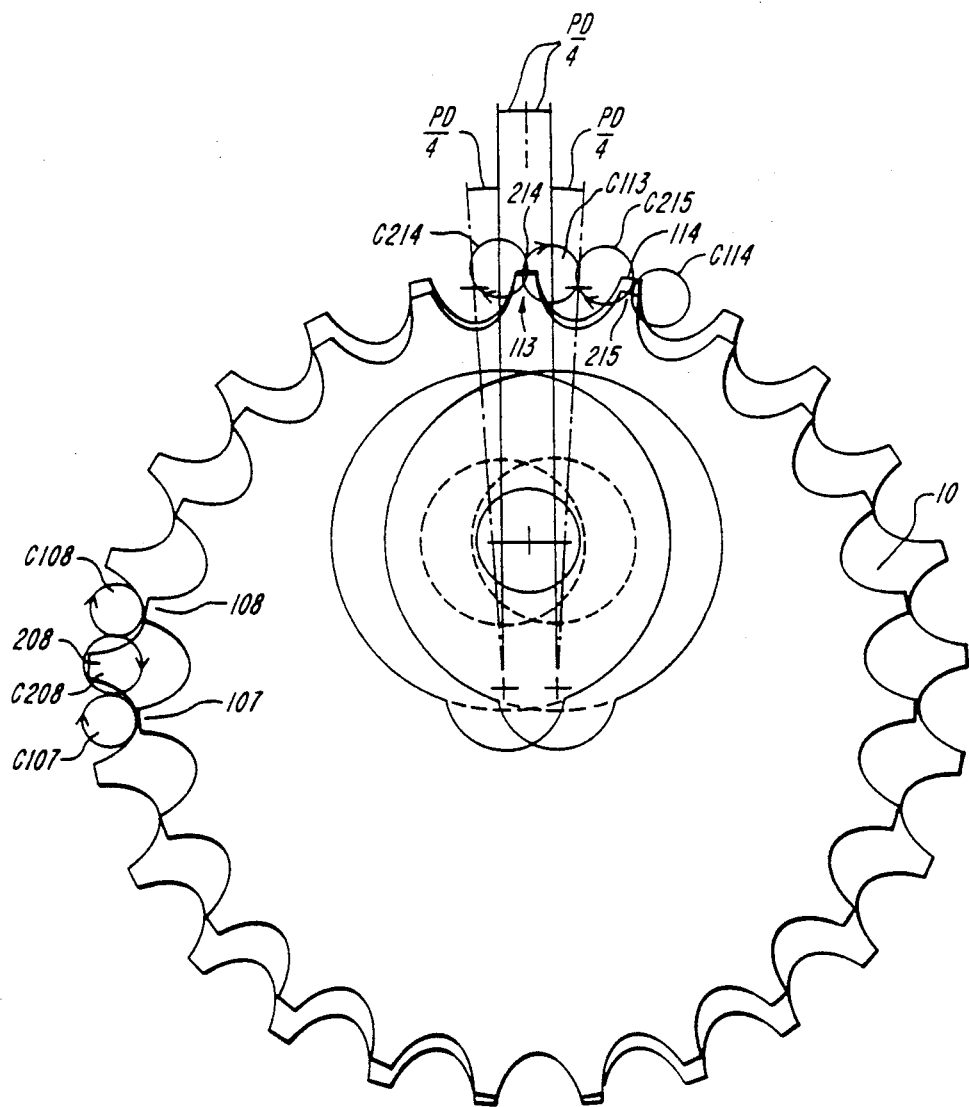
FIG. 7 shows schematically the orbital paths of sprocket teeth on each of the two sprocket wheels, which effects the translation of the chain.

For instance, as shown in FIG. 7, the tip of tooth 113 moves clock-wise around the circle C 113. The tooth 214 also moves clock-wise around the circle C 214. At the moment in time illustrated in FIG. 7, the tip of tooth 113 is moving radially outward while the tip of tooth 214 is moving radially inward. Similarly, the tip of tooth 108 moves about circle C 108 while the tip of tooth 208 moves around the circle C 208. As shown in FIG. 7, tooth 108 is moving in the same direction as is tooth 113, i.e., toward the bottom of the page and tangentially downward with respect to the pitch circle at that location. Tooth 208 is moving in the opposite direction, i.e., tangentially upward and is located approximately one-half pitch separation radially outward from the location of tooth 108. An important parameter to maintain is that the tooth height must be slightly less than the diameter of the circle, e.g. C 107, around which the tooth orbits. If the tooth height were greater than this amount, then the teeth on the sprocket that is not carrying the chain will interfere with the chain riding in the trough of the other sprocket.

The means by which the sprocket transmits motion to the chain 40 will be understood with reference to FIGS. 6 and 7. As tooth 113 moves about circle C 113, it moves radially outward and engages a roller 44 of chain 40 and moves that roller generally in a clock-wise direction. At the point where tooth 113 has moved so that it is halfway along its radially inward course around circle C 113, tooth 215 on sprocket 20 has moved around circle C 215 so that it is halfway along its radially outward course and at that point, teeth 113 and 215 will be substantially in register (in the manner that teeth 113 and 214 register in FIG. 7. As tooth 113 moves radially inward, it will eventually lose contact with the roller of chain 40. As tooth 215 continues radially outward, it will pick up the roller of chain 40 as that roller loses contact with tooth 113. The roller will be urged onward generally along the path of the radially outer portion of circle C 215. As tooth 215 completes its circuit and reaches halfway along its radially inward course, the roller will be handed to tooth 114, which is at that moment halfway along its radially outward course along circle C 114.

Thus, the action is similar to that of a flexible band being carried along by a pair of twiddling thumbs.

It will be understood that the foregoing action takes place over the course of one full rotation of motor shaft 2, i.e., the transfer from sprocket 10, tooth 113 to tooth 214 of sprocket 20 and to tooth 215 back on sprocket 10, takes one full shaft rotation.

During the cycle of one full rotation of motor shaft 2, as the point of pairing or registration of the two sprocket wheels 20 and 10 migrates around the sprocket, every point of the chain which is in contact with either of the sprocket wheels is being urged generally in the direction of motion of the motor shaft, i.e., clockwise in the example described. As shown in FIG.

6, the chain 40 is in contact with the dual sprocket unit over substantially half of the circumference.

As shown on FIG. 6, sprocket 10 engages the chain from approximately clock position 12:00 to clock position 3:00. Sprocket 20 engages the chain from clock position 3:00 to clock position 6:00. When the shaft 2 is rotated 180°, the engagement is exactly reversed. When the shaft 2 is rotated clockwise 90° from the position shown in FIG. 6, so that the oval shape has its longer axis parallel to the arrows M, rather than perpendicular to them, sprocket 10 engages the chain substantially from the 12:00 clock position to the 6:00 position and sprocket 20 is substantially free of the chain.

The two locations at which the pair of sprockets register (i.e., a pair of teeth and a pair of troughs at the other end of an "oval diameter" (i.e., a line which bisects the oval into two parts of equal shape and area)), always lies on an oval diameter that is perpendicular to the journal plane. Thus, for each rotation of the motor shaft and journals, the location of registration makes one rotation also.

As a result of this motion, for each rotation of the motorshaft, the chain advances one link. If the chain 40 engages a driven sprocket mounted on a shaft, then the driven sprocket will advance one sprocket tooth for each rotation of the motorshaft 2. For example, an 1800 RPM motor will drive a 30 tooth driven sprocket at 60 RPM. The more teeth on the driven sprocket, the slower will be its rotational speed. There is no need for the driven sprocket to be the same size as the driving sprockets. If the driven sprocket is much larger than the driving sprockets, then it is helpful to include an idler wheel to train the chain tightly around the driving sprockets. If the driven sprocket is smaller than the driving sprockets, no idler is necessary.

The amount of force that the sprocket drive can generate with respect to the horsepower of the motor depends upon the eccentricity of the location of bores 9 and 19, i.e., the distance G. This is evident from an examination of the tension in the chain as shown schematically in FIG. 10. The diagram in FIG. 10 is a force diagram showing either sprocket 10 or 20. If the force at the axis 32 applied to the sprocket is A, the sum of $T_1$ and $T_2$ must also equal A. However, because the sprocket is not rotating, the torque about axis 32 must equal zero.

The torque $= 0 = T_2(R+G) - T_1(R-G)$ $T_2(R+G) = T_1(R-G)$ $T_2 = T_1((R-G)/(R+G))$ if $G = R/2$ then $T_1 = 3T_2$ Analysis of the foregoing points out that $T_1$ will always be greater than $T_2$, the amount depending on the ratio between G and R. Thus, the system will automatically adjust to take up any slack. As has been mentioned, the sprockets 10 and 20 are free to rotate through bearings 8 and 18 around the journals 4 and 14. If slack develops in the portion of the chain that generates $T_2$, i.e., the nonloaded portion, and thus $T_2$ decreases, the pair of sprockets will rotate together counter-clockwise, i.e., opposite the direction of motion of the chain in the direction urged by $T_1$, until $T_2$ increases and the torques balance out and the slack is taken up. The slack is taken up because the eccentrically mounted sprockets constitute a lobe located between the central axis and the slack side of the chain. As the sprockets rotate counter-clockwise, the lobe moves counter-clockwise also, thus essentially lengthening the path the chain must travel to completely go around the sprocket.

The invention provides other advantages that will be understood by one of ordinary skill in the art. If the motor is a two-direction type, the sprocket drive of the invention accommodates the reverse direction. Upon reversal of the motor, the sprockets try to move the chain in the opposite direction, i.e., in the direction the motor shaft rotates. However, the chain exerts forces on the sprockets that cause an unbalanced torque, so that the sprocket pair rotates around in the opposite direction as the motor shaft, and the chain will not be driven, until the sprockets are oriented in the reverse of those as shown in FIG. 5, i.e., the center of rotational symmetry of the sprockets will now be above the motor shaft 2 and the point where the chain initially contacts the sprocket wheel will be below it. During this reversal, the chain remains fixed and the sprockets walk around, with the lobe moving into the open portion of the loop. In this case, the loaded portion of the chain and the slack portion of the chain will be reversed.

The sprocket drive of the invention also automatically accommodates for an overhauling situation, i.e., a situation where, rather than opposing the urging of the sprocket drive and motor, the load suddenly shifts to be in the same direction. Such a situation occurs for instance if a load being transported on a conveyor system arrives at a downhill section of the system and gravity acts to accelerate the load. In this situation, the sprocket drive rotates ahead with the chain, i.e., it rotates in the direction the chain is being urged to move, approximately 180°, until the loading conditions are again similar to the forward drive situation, but exactly reversed. In this case, however, the load is being held back.

It is also an aspect of the invention to mount the sprocket drive to avoid destruction of the drive in the case of an overload. This can be accomplished in a number of ways, all of which are conceptually similar. The sprocket drive advances the chain by very small translational motion of the sprockets 10 and 20. Each one moves in the two directions parallel the chain tension around a circle having a diameter of only ½ of a pitch distance. Therefore, if an overload causes the chain to stop translating, the drive can be made strip resistant by allowing it to oscillate parallel the direction of the tension on the chain portions. As shown in FIG. 1b, it is merely necessary to mount the motor 241 on a platform 242, spring loaded by spring 245 to ground 247, so that if the chain 240 is stopped by an overload from advancing around the sprockets 210, 220, the sprockets rotate counter clockwise (in this example) within the chain loop full cycle while the motor and shaft merely oscillate back and forth as indicated in phantom once per rotation of the sprockets, i.e., once per 24 rotations of the motor shaft in this example.

Another variation of this strip resistant embodiment as shown in FIG. 10c, includes the use of an idler sprocket 255 mounted on an arm 260 spring loaded to rotate counter-clockwise to ground in this case, the output shaft 250. It is important to note that the spring, which accepts the energy from the rotating shaft when the chain cannot, is a static element. All other known devices, such as clutches, involve rotating parts, and an eventual wearing away. There is no greater deterioration of the sprockets and belt when the load is jammed than there is if the load is being moved.

Although the foregoing discussion contemplates that the transmission wheels are toothed sprocket wheels, it is also possible to use a pair of toothed timing pulleys and a timing belt. In this embodiment, rather than a moving chain, the output will be the moving timing belt. It is possible for the timing belt to drive another timing pulley, which pulley may be attached to a shaft.

For certain applications, the moving timing belt itself is the desired direct output. There is no analog to the driven sprocket and shaft, driven by the chain as described above. In this case the driven pulley is merely an idler.

In another preferred embodiment of the invention, rather than using a wheel having sprockets or teeth, a toothless pulley and a toothless belt are used, relying upon friction to provide the motive force. In the toothless embodiment, the relationship between the rotational speed of the motor shaft and the translational speed of the drive belt depends solely upon the eccentricity of the two journals with respect to the motor shaft 2. As shown in FIG. 11, in general, for an eccentricity e, measured between the central axis 332 of axle 302 and axes 330 and 331, again the toothless sprockets are arranged to present a slightly oval envelope.

The oval shape arises because the wheels are eccentrically mounted 180° out of phase. Wheel 310 is in most intimate contact with the loaded portion of the belt 340 generally when the shaft is oriented so that the axis of the journal (not shown) associated with wheel 310 is between the axle 302 and the closed portion of the loop of the belt. As wheel 310 moves in its small orbit, it moves the belt forward. When wheel 320 comes into contact with the loaded portion, it picks up the belt 340 and moves it forward. The belt 340 moves forward an amount approximately equal to 2×e, for each wheel, for each rotation of the shaft. As shown in FIG. 11, the eccentricity, e, of the toothless transmission wheel, is exactly analogous to the eccentricity J=PD/4 of the toothed sprockets. As shown in FIG. 7, for each rotation of the axle 2, each wheel moves the belt ahead a distance equal to the diameter of circles C 214, C 113. The diameter is equal to 2×PD/4=2×J. Thus, for a full rotation of the shaft 2, the total advance of the belt is 2×2×J=4J. The situation with respect to the toothless transmission wheels 310, 320 is exactly analogous. Thus, for a full rotation, the belt advances a distance of 4e.

Figure 12:
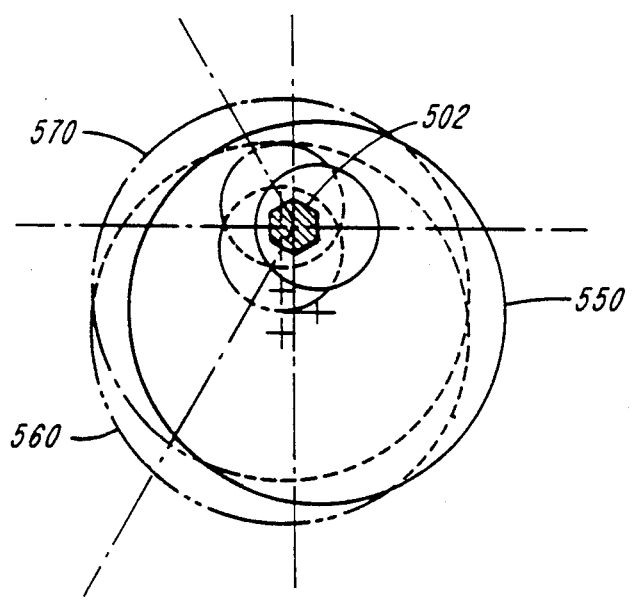

With a 2-wheel system, the belt moves just as a chain does, i.e. in a cycloidal fashion. In the case of a toothless embodiment, it is possible to smooth the periodicity of the motion by adding additional pairs of eccentric mounted pulleys. This is shown schematically in FIG. 12. A longer axle 502 is used, carrying three pairs of pulleys on the axle like a shish kabob. For purpose of clarity, only one member of each pair is shown. The other member of each pair is mounted on a journal exactly 180° out of phase from its mate. It is not necessary that all pulley pairs be exactly 180° out of phase. In fact, it is merely desirable that the angular separation between adjacent pulleys be as close to 180° as possible. This angular separation enables obtaining the maximum amount of unrestricted contact between a pulley and the loaded portion of the belt, before the adjacent pulley begins to lift the belt away from the first pulley. However, if adjacent pulleys were out of phase with each other by exactly 180°, after the first pair of pulleys, it would not be possible to locate another pulley 180° out of phase with the second pulley, except at the original starting phase point. This third pulley would not provide any additional smoothing to the motion.

A preferred embodiment is to place each pulley pair an angular separation from the previous pulley pair determined by the relation 360°/PP where PP is the total number of pulley pairs present. This provides the best compromise between a smooth progression and maximum contribution to the forward motion by each of the pulleys. The pair members are 180° out of phase from each other and need not be adjacent.

A preferred method of aligning such pulleys is to use a motor shaft 502 having a cross section (of a many-sided parallelogram, such as a hexagon and to attach identical pulleys 550, 560 and 570 keyed to each of the various faces of the parallelogram. Each pair will operate as described above, except that each pair will only be responsible for moving the belt ahead one third of the total 4e distance. This is because, before the pulley pair finishes dragging ahead the belt the maximum distance, another pair lifts the belt from the first pair and moves it ahead itself.

With a toothless embodiment, it is possible to vary the transmission ratio from the motor shaft to a driven shaft not only by changing the diameter of the pulley attached to the driven shaft, but also by changing the eccentricity of the journals on the driving shaft. As shown in FIG. 13, this is accomplished in another preferred embodiment of the invention by adding a variably eccentric sleeve between the journals 4, 14 and the inner races of bearings 8, 18. The sleeves may be variably eccentric, having a spring (not shown) bias in the forward direction. FIG. 13 shows schematically two eccentric sleeves 90, 92. Sleeve 90 and journal 4 associated with it are shown in bold and sleeve 92 and associated journal are shown in light outline. The sleeves are rotated various amounts in the same direction the same amount upon two opposite eccentric journals 4, 14 of the same eccentricity e through a range of 0°–180°. Journals 4, 14 are secured to shaft 2. Bearings are not shown but would be concentric with and surrounding sleeves 90, 92. The shaft 2 and journals are shown in a stationary position and do not change position from one view of FIG. 13 to the next. The net overall eccentricity between the two bearings varies from a maximum of 4e, corresponding to a rotation from the forward biased position 0°, down to zero, corresponding to a rotation of 180°. If the spring bias of the sleeves 90, 92 is forward to the maximum eccentricity position, increasing the load torque will cause the sleeves to rotate backward against the spring torque toward the zero net eccentricity position (180°), which increases the effective overall speed ratio (input to output) toward infinity. This is illustrated by the general relation, speed reduction ratio times load torque=a constant.

In this embodiment, the device can serve as a continuously variable drive. If the eccentricity varies inversely with load torque, it becomes an automatic, constant horsepower continuously variable transmission.

The foregoing should be taken as illustrative and not limiting in any sense. Those of ordinary skill in the art will understand readily that modifications to the foregoing are within the spirit of the invention.

Having thus described the invention, what is claimed is:

1. A drive for transducing rotation of a motor shaft comprising:

a. a multiple eccentric journal unit having a hollow sized to fit over the motor shaft and at least one pair of journals, each member of a pair concentric with an axis parallel to the axis of the hollow and spaced apart from its mate an equal distance on opposite sides of and coplanar with the hollow axis;

b. means for securing the eccentric journal unit to the motor shaft;

c. a rotational bearing attached to each journal;

d. associated with each bearing, a transmission wheel having means for mounting said wheel to said bearing eccentrically from the axis of rotational symmetry of said transmission wheel an equal radial amount as compared to the transmission wheel associated with the other journal of the dual journal pair.

2. The apparatus of claim 1, wherein said journal unit is dual eccentric and has only one pair of journals and the transmission wheels are sprockets having a discernible tooth pitch distance, pitch angle and pitch cycle.

3. The apparatus of claim 2, wherein said journal axes are each spaced apart from the hollow axis a distance equal to ¼ of a tooth pitch distance.

4. The apparatus of claim 3 wherein said means for mounting each sprocket eccentrically an equal radial amount from the respective axis of rotational symmetry comprises a bore, said bore of a first sprocket of a pair of sprockets located, with respect to the pitch cycle at an angular displacement from the bore of the other sprocket equal to one half the tooth pitch angle.

5. The apparatus of claim 4 wherein said sprockets are identical to each other.

6. The apparatus of claim 5 wherein said sprocket radial eccentricity is approximately ½ the sprocket radius.

7. The apparatus of claim 1 wherein said transmission wheels are toothless pulleys.

8. The apparatus of claim 7 wherein said journals are spaced apart an equal and variable distance from the hollow shaft axis.

9. The apparatus of claim 1 wherein said transmission wheels are timing pulleys having a discernible tooth pitch distance, pitch angle and pitch cycle.

10. The apparatus of claim 1 further comprising means for translating the position of the motor shaft with respect to a belt driven by the transmission wheels.

11. The apparatus of claim 10, said means for translating comprising a spring between the motor shaft and translational ground.

12. The apparatus of claim 1, further comprising means for decreasing the tension in a belt driven by the transmission wheels.

13. The apparatus of claim 12, said means for decreasing the tension comprising an idler around which the belt is partially trained, spring loaded to translational ground.

14. The apparatus of claim 1, further comprising at least two pairs of transmission wheels.

* * * * *